(12) United States Patent
Walenta et al.

(10) Patent No.: US 8,317,915 B2
(45) Date of Patent: Nov. 27, 2012

(54) ADDITIVES FOR A HYDRAULIC BINDER BASED ON BELITE-CALCIUM-SULPHOALUMINATE-FERRITE CLINKER

(75) Inventors: Gunther Walenta, Genas (FR); Ellis Gartner, Lyons (FR); Vincent Morin, Lyons (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/390,797

(22) PCT Filed: Jul. 20, 2010

(86) PCT No.: PCT/FR2010/051524
§ 371 (c)(1),
(2), (4) Date: Feb. 16, 2012

(87) PCT Pub. No.: WO03/054346
PCT Pub. Date: Jul. 3, 2003

(65) Prior Publication Data
US 2012/0145045 A1    Jun. 14, 2012

(30) Foreign Application Priority Data
Aug. 17, 2009 (FR) ..................................... 09 03985

(51) Int. Cl.
- C04B 7/32 (2006.01)
- C04B 7/345 (2006.01)
- C04B 28/02 (2006.01)
- C04B 28/14 (2006.01)
- C04B 28/06 (2006.01)

(52) U.S. Cl. ......... 106/695; 106/692; 106/693; 106/694
(58) Field of Classification Search .................. 106/692, 106/693, 694, 695
See application file for complete search history.

(56) References Cited

U.S. PATENT DOCUMENTS

| 3,801,338 A | 4/1974 | Whitaker |
| 4,318,744 A | 3/1982 | Dodson |
| 4,373,956 A | 2/1983 | Rosskopf |
| 5,017,234 A | 5/1991 | Gartner et al. |
| 7,326,478 B2 * | 2/2008 | Bouscal et al. ............... 428/703 |
| 8,177,903 B2 * | 5/2012 | Walenta et al. ............... 106/695 |
| 2007/0266903 A1 | 11/2007 | Gartner et al. |

FOREIGN PATENT DOCUMENTS

| CA | 2712437 A1 * | 10/2009 |
| DE | 195 01 074 | 7/1996 |
| EP | 0 415 799 | 12/1994 |
| EP | 1 392 616 | 3/2004 |
| FR | 2 873 366 | 1/2006 |
| JP | 2004-284865 | 10/2004 |
| WO | WO 99/02465 | 1/1999 |
| WO | WO 03/054346 | 7/2003 |

OTHER PUBLICATIONS

M. Stepita, "Setting Accelerator for Cement," Chemical Abstracts, Dec. 16, 1985, No. 24, XP000184295.
T. Kuroda, "Cement Compositions," Chemical Abstracts, Sep. 7, 1987, No. 10, XP000061613.
Zhang Jusong et al., "The Influence of TiO2 on the Formation of Belite-Calcium Sulfoaluminate Cement," Cement Guide for New Epoch N°3 17-19 (2002).
Woo-Hyeong Chae et al., "Early Hydratation of Modified Belite Cement Prepared by Adding Borax," The Korean Journal of Ceramics 2 (3) 147-151 (1996).
International Search Report for PCT/FR2010/051524, (Jan. 2011).

\* cited by examiner

*Primary Examiner* — Anthony J Green
(74) *Attorney, Agent, or Firm* — Pillsbury Winthrop Shaw Pittman, LLP

(57) ABSTRACT

A composition includes at least, in % expressed by mass relative to the total mass of the composition, from 0.01 to 3% of polycarboxylic acid or salts thereof, the polycarboxylic acid including 2 to 4 carboxyl groups per molecule; and from 97 to 99.99% of a Belite-Calcium-Sulphoaluminate-Ferrite clinker (BCSAF clinker).

19 Claims, No Drawings

ADDITIVES FOR A HYDRAULIC BINDER BASED ON BELITE-CALCIUM-SULPHOALUMINATE-FERRITE CLINKER

CROSS-REFERENCE TO RELATED APPLICATIONS

This is the U.S. National Stage of PCT/FR2010/051524, filed Jul. 20, 2010, which in turn claims priority to French patent application Ser. No. 09/03985, filed Aug. 17, 2009, the entire contents of both applications are incorporated herein by reference in their entireties.

The present invention relates to a composition comprising a Belite-Calcium-Sulphoaluminate-Ferrite clinker (BCSAF clinker) with at least one polycarboxylic acid or salts thereof, to its use for the preparation of hydraulic binders, to a cement comprising the said clinker, as well as to the use of polycarboxylic acid or salts thereof to increase the mechanical strengths of hydraulic binders.

BCSAF clinkers are clinkers with a low content of alite or an absence of alite, which is one of the mineralogical phases of conventional clinkers of the Portland type. Alite is an impure form of calcium trisilicate, $Ca_3SiO_5$, for which the conventional notation is $C_3S$.

For the remaining of the description of the invention, the following abbreviated notations will be used, unless explicitly stated otherwise, to designate the mineralogical components of the cement:

C represents CaO (lime),
A represents $Al_2O_3$ (alumina),
F represents $Fe_2O_3$,
S represents $SiO_2$ (silica),
$ represents $SO_3$,
H represents $H_2O$ (water).

These BCSAF clinkers have the further advantage of substantially reducing emissions of CO2 compared to the production of Portland types of clinkers. Cements have been developed by industrialists from these BCSAF clinkers, they are BCSAF cements.

However, it has become necessary to produce BCSAF cements based on BCSAF clinkers, the mechanical strengths of which are increased for an identical quantity of clinker.

Furthermore, it is common during the production of BCSAF cements to add limestone to the BCSAF clinker, commonly called limestone filler ($CaCO_3$). This limestone makes it possible to reduce the quantity of clinker in the cement, and hence reduce the emissions of $CO_2$.

However, limestone has the disadvantage of having low hydraulic properties and also slowing the evolution of the BCSAF cement's mechanical strength after setting.

Therefore, the problem which the invention intends to solve is to find a means of improving the acquisition of mechanical strengths after the setting of BCSAF cements containing or not containing limestone.

Unexpectedly, the inventors have shown that it is possible to mix at least one polycarboxylic acid or salts thereof with a BCSAF clinker whilst keeping and/or increasing the mechanical strengths, in particular long-term mechanical strengths (28 days).

With this aim the present invention provides a composition comprising at least, in % expressed by mass relative to the total mass of the composition, from 0.01 to 3% of polycarboxylic acid or salts thereof, the said polycarboxylic acid comprising 2 to 4 carboxyl groups per molecule; and from 97 to 99.99% of a Belite-Calcium-Sulphoaluminate-Ferrite clinker (BCSAF clinker) comprising at least, in % expressed by mass relative to the total mass of BCSAF clinker from 5 to 30%, of a calcium aluminoferrite phase of a composition corresponding to the general formula $C_2A_xF_{(1-x)}$, wherein X is from 0.2 to 0.8;

from 10 to 35%, of a calcium sulfoaluminate phase <<ye'elimite>> ($C_4A_3$\$), from 40 to 75% of belite ($C_2S$), from 0.01 to 10% of one or more minor phases selected from calcium sulphates, alkali sulphates, perovskite, gehlenite, free lime and periclase, and/or a vitreous phase, and for which the total of the percentages of these phases is greater than or equal to 97%.

The invention also relates to a cement comprising at least from 30 to 99.9% of a composition as herein before described; and from 0.1 to 40% of calcium sulphate, % by mass relative to the total mass of cement;

from 0.1 to 70% of mineral additions, % by mass relative to the total mass of cement.

The invention also relates to a concrete or a mortar comprising at least a BCSAF cement and at least one polycarboxylic acid or salts thereof, the said polycarboxylic acid comprising 2 to 4 carboxyl groups per molecule.

The invention also relates to the use of at least one polycarboxylic acid or salts thereof to increase the mechanical strength of BCSAF cements after setting, the said polycarboxylic acid comprising 2 to 4 carboxyl groups per molecule.

Finally, the invention also relates to a process for the preparation of a concrete or of a mortar comprising a step of mixing a BCSAF cement with aggregates, water, at least one polycarboxylic acid or salts thereof and optionally additives, the said polycarboxylic acid comprising 2 to 4 carboxyl groups per molecule.

The invention provides at least one of the determining advantages herein below described.

Advantageously, the cements according to the invention have high long-term mechanical strengths, in particular after 28 days.

The invention provides the advantage that the BCSAF clinker can be mixed with limestone in order to reduce the quantity of clinker in the cement, without slowing the acquisition of mechanical strengths, or without losing the cement's mechanical strengths after setting.

The invention provides another advantage in that the polycarboxylic acid used according to the invention further allows the paste of BCSAF cement to fluidize.

The invention provides another advantage in that the compositions according to the invention meet or exceed the performances required in current modern concrete applications.

Finally, the invention has the advantage of being able to be used in all industries, in particular the construction industry, the cement industry, and in all construction markets (buildings, civil engineering or pre-cast plants).

Other advantages and characteristics of the invention will clearly appear after reading the following description and examples provided purely for illustrative and non-limiting purposes.

The expression <<hydraulic binder>>, is to be understood according to the present invention as any compound which has the property of becoming hydrated in the presence of water and the hydration of which makes it possible to obtain a solid having mechanical characteristics. The hydraulic binder according to the invention may in particular be a cement.

The term <<concrete>>, is to be understood as a mix of hydraulic binders, aggregates, water, optionally additives, and optionally mineral additions, for example high performance concrete, very high performance concrete, self-placing concrete, self-levelling concrete, self-compacting concrete, fibre concrete, ready-mix concrete or coloured concrete. The term <<concrete>>, is also to be understood as concretes having been submitted to a finishing operation, for example bush-hammered concrete, exposed or washed concrete or polished concrete. Pre-stressed concrete is also to be understood by this definition. The term <<concrete>> comprises mortars, in this specific case concrete comprises a mix of hydraulic binder, sand, water and optionally additives and optionally mineral additions. The term <<concrete>> according to the invention denotes indistinctly fresh concrete or hardened concrete.

The term <<aggregates>>, is to be understood according to the invention as a granular material used in construction, which may be natural, artificial or recycled, as defined in the French XP P18-545 Standard. By way of example of aggregates, mention may be made of gravel, fine sand gravel, lightweight aggregates and/or artificial aggregates.

The expression <<mineral additions>>, is to be understood according to the invention as slags (as defined in the <<Cement>> NF EN 197-1 Standard, paragraph 5.2.2), steel industry slags, pozzolanic materials (as defined in the <<Cement>> NF EN 197-1 Standard, paragraph 5.2.3), fly ash (as defined in the <<Cement>> NF EN 197-1 Standard, paragraph 5.2.4), calcined shale (as defined in the <<Cement>> NF EN 197-1 Standard, paragraph 5.2.5), limestones (as defined in the <<Cement>> NF EN 197-1 Standard, paragraph 5.2.6), or silica fume (as defined in the <<Cement>> NF EN 197-1 Standard, paragraph 5.2.7) or mixtures thereof.

The term <<clinker>>, is to be understood according to the invention as the product obtained after burning (clinkerisation) of a mix (raw meal) composed, among others for example of limestone and for example of clay.

The expression <<Portland cement>>, is to be understood according to the invention as a cement of type CEM I, CEM II, CEM III, CEM IV or CEM V according to the NF EN 197-1 <<Cement>> Standard.

The expression <<Portland clinker>>, is to be understood according to the invention as a clinker as defined by the NF EN 197-1 <<Cement>> Standard.

The abbreviation <<BCSAF>> is to be understood according to the invention as Belite-Calcium-Sulphoaluminate-Ferrite.

The expression <<BCSAF cement>>, is to be understood according to the invention as a cement comprising at least one BCSAF clinker and at least one source of calcium sulphate.

The term <<BCSAF clinker>>, is to be understood according to the invention as a clinker which may be obtained according to the process described in patent application WO 2006/018569 or a clinker comprising at least, in % expressed by mass relative to the total mass of BCSAF clinker from 5 to 30%, of a calcium aluminoferrite phase of a composition corresponding to the general formula $C_2A_XF_{(1-X)}$, wherein X is from 0.2 to 0.8;

from 10 to 35%, of a calcium sulfoaluminate phase <<ye'elimite>> ($C_4A_3\$$), from 40 to 75% of belite ($C_2S$), from 0.01 to 10% of one or more minor phases selected from calcium sulphates, alkali sulphates, perovskite, gehlenite, free lime and periclase, and/or a vitreous phase, and for which the total of the percentages of these phases is greater than or equal to 97%.

The term <<phase>>, is to be understood according to the invention as a mineralogical phase.

The term <<element>>, is to be understood according to the invention as a chemical element according to the Periodic Table of Elements.

The following terms, are to be understood according to the invention:

$C_3S$: impure tricalcium silicate ($Ca_3SiO_5$): (Alite) $3(CaO).(SiO_2)$ $C_2S$: impure dicalcium silicate ($Ca_2SiO_4$): (Belite) $2(CaO).(SiO_2)$ $C_3A$: Tricalcium aluminate ($Ca_3Al_2O_6$): (Aluminate) $3(CaO).(Al_2O_3)$ $C_4AF$: Tetracalcium-aluminateferrite ($Ca_4Al_2Fe_2O_{10}$): (Ferrite or aluminoferrite or brownmillerite) $4(CaO).(Al_2O_3).(Fe_2O_3)$, or more generally a compound of the general formula $2(CaO).x(Al_2O_3).(1-x)(Fe_2O_3)$ wherein X is from 0.2 to 0.8

$C_4A_3\$$: calcium sulfoaluminate <<ye'elimite>> $4(CaO).3(Al_2O_3).(SO_3)$

Limestone: $CaCO_3$

Gypsum: $CaSO_4.2(H_2O)$;

Calcium sulphate hemihydrate (plaster): $CaSO_4.0.5H_2O$;

Anhydrous calcium sulphate (anhydrite): $CaSO_4$;

Periclase: $MgO$;

Silica or quartz: $SiO_2$.

The term <<clay>>, is to be understood according to the present invention as a sedimentary rock, for a large part composed of specific minerals, silicates, generally of more or less hydrated aluminium, which have a layer structure (phyllosilicates), or a fibrous structure (sepiolite and palygorskite).

The term <<setting>>, is to be understood according to the present invention as the passage to the solid state by chemical hydration reaction of the hydraulic binder. The setting is generally followed by a hardening period.

The term <<hardening>>, is to be understood according to the present invention as the acquisition of mechanical properties of a hydraulic binder, after the end of the setting phase.

The expression <<elements for the construction field>>, is to be understood according to the present invention as any element being part of a construction, for example a floor, a screed, a foundation, a wall, a partition wall, a ceiling, a beam, a work top, a pillar, a bridge pier, a concrete block, a pipe, a post, a cornice, an element of road works (for example a border of a pavement) a roof tile, an element of drainage canalisations.

First of all the present invention relates to a composition comprising at least, in % expressed by mass relative to the total mass of composition, from 0.01 to 3% of polycarboxylic acid or salts thereof, the said polycarboxylic acid comprising 2 to 4 carboxyl groups per molecule; and from 97 to 99.99% of a Belite-Calcium-Sulphoaluminate-Ferrite clinker (BCSAF clinker) comprising at least, in % expressed by mass relative to the total mass of BCSAF clinker from 5 to 30%, of a calcium aluminoferrite phase of a composition corresponding to the general formula $C_2A_XF_{(1-X)}$, wherein X is from 0.2 to 0.8;

from 10 to 35%, of a calcium sulfoaluminous phase <<ye'elimite>> ($C_4A_3\$$), from 40 to 75% of belite ($C_2S$), from 0.01 to 10% of one or more minor phases selected from calcium sulphates, alkali sulphates, perovskite, gehlenite, free lime and periclase, and/or a vitreous phase, and for which the total of the percentages of these phases is greater than or equal to 97%, preferably greater than or equal to 98%, more preferably greater than or equal to 99%, most preferably equal to 100%, Belite is a well known mineralogical phase for the person skilled in the art which, in the pure state, has the composition $Ca_2SiO_4$ but which may also contain impurities.

The <<ye'elimite>> phase is a mineralogical phase which, in the pure state, has the composition $Ca_4Al_6SO_{16}$ but which may also contain impurities.

The aluminoferrite phase is a mineralogical phase which, in the pure state, has the formula $C_2A_XF_{(1-X)}$, wherein X is from 0.2 to 0.8 but which may also contain impurities.

Impurities are to be understood as any element of the Periodic Table of Elements.

Preferably the mineralogical phases of the BCSAF clinker of the composition according to the invention further comprise one or more secondary elements selected from magnesium, sodium, potassium, boron, phosphorus, zinc, manganese, titanium, fluorine, chlorine.

Preferably, the composition according to the invention comprises 0.01 to 3% of polycarboxylic acid, more preferably 0.03 to 1%, most preferably 0.1 to 0.5%, % by mass relative to the total mass of composition.

Advantageously, the composition according to the invention comprises at least one polycarboxylic acid or a salt thereof selected from citric acid, malonic acid, malic acid, glutaric acid, adipic acid, oxalic acid, maleic acid, tartaric acid, succinic acid, ascorbic acid, glutamic acid or mixtures thereof.

Preferably, the composition according to the invention comprises at least one polycarboxylic acid or salts thereof selected from citric acid, malic acid, ascorbic acid, oxalic acid, succinic acid or mixtures thereof.

Most preferably, the composition according to the invention comprises at least one citric acid or salts thereof.

Advantageously, the composition according to the invention further comprises an alkanolamine.

Preferably, the composition according to the invention further comprises an alkanolamine selected from triethanolamine (TEA), diethanolamine (DEA), tetrakis-hydroxy-ethyl-ethylene-diamine (THEED), or methyl-diethanolamine (MDEA).

Most preferably, the composition according to the invention further comprises diethanolamine or methyl-diethanolamine.

Preferably, the composition according to the invention comprises from 97 to 99.99% of a BCSAF clinker, more preferably from 99 to 99.97%, most preferably from 99.5 to 99.9%, % by mass relative to the total mass of composition.

Preferably, the composition according to the invention comprises a Belite-Calcium-Sulphoaluminate-Ferrite clinker (BCSAF clinker) comprising at least, in % expressed by mass relative to the total mass of BCSAF clinker in the composition from 10 to 25%, of a calcium aluminoferrite phase of a composition corresponding to the general formula $C_2A_XF_{(1-X)}$, wherein X is from 0.2 to 0.8;

from 15 to 30%, of a calcium sulfoaluminate phase <<ye'elimite>> ($C_4A_3\$$), from 45 to 70% of belite ($C_2S$), from 0.01 to 10% of one or more minor phases selected from calcium sulphates, alkali sulphates, perovskite, gehlenite, free lime and periclase, and/or a vitreous phase, and for which the total of the percentages of these phases is greater than or equal to 97%, preferably greater than or equal to 98%, more preferably greater than or equal to 99%, most preferably equal to 100%.

More preferably, the composition according to the invention comprises a Belite-Calcium-Sulphoaluminate-Ferrite clinker (BCSAF clinker) comprising, in % expressed by mass relative to the total mass of BCSAF clinker in the composition, at least from 15 to 25%, of a calcium aluminoferrite phase of a composition corresponding to the general formula $C_2A_XF_{(1-X)}$, wherein X is from 0.2 to 0.8;

from 20 to 30%, of a calcium sulfoaluminate phase <<ye'elimite>> ($C_4A_3\$$), from 45 to 60% of belite ($C_2S$), from 0.01 to 10% of one or more minor phases selected from calcium sulphates, alkali sulphates, perovskite, gehlenite, free lime and periclase, and/or a vitreous phase, and for which the total of the percentages of these phases is greater than or equal to 97%, preferably greater than or equal to 98%, more preferably greater than or equal to 99%, most preferably equal to 100%, and in that it contains one or more secondary elements selected from sulphur, magnesium, sodium, potassium, boron, phosphorus, zinc, manganese, titanium, fluorine, chlorine, aluminium.

The mineralogical phases of the BCSAF clinker of the composition according to the invention may comprise as major elements: calcium, aluminium, silica, iron, oxygen and sulphur.

The BCSAF clinker of the composition according to the invention may comprise at least the following main oxides present in relative proportions, % expressed by mass relative to the total mass of BCSAF clinker:

CaO: 45 to 61%
Al2O3: 3 to 22%
SiO2: 15 to 25%
Fe2O3: 3 to 15%
$SO_3$: 2 to 10%.

The mineralogical phases of the BCSAF clinker of the composition according to the invention may comprise one or more secondary elements, in % expressed by mass relative to the total mass of BCSAF clinker in the composition, selected from magnesium, sodium, potassium, boron, phosphorus, zinc, manganese, titanium, fluorine, chlorine, preferably present in the following quantities:

from 0 to 5% of magnesium expressed as magnesium oxide, from 0 to 5% of sodium expressed as sodium oxide, from 0 to 5% of potassium expressed as potassium oxide, from 0 to 3% of boron expressed as boron oxide, from 0 to 7% of phosphorus expressed as phosphoric anhydride, from 0 to 5% of zinc, manganese, titanium or mixture thereof, expressed as oxides of these elements, from 0 to 3% of fluoride, chloride, or mixtures thereof, expressed as calcium fluoride and calcium chloride, the total content of the said secondary elements being less than or equal to 15%.

The mineralogical phases of the BCSAF clinker of the composition according to the invention may preferably comprise, in % expressed by mass relative to the total mass of BCSAF clinker in the composition, the following secondary elements:
from 1 to 4% of magnesium expressed as magnesium oxide,
from 0.1 to 2% of sodium expressed as sodium oxide,
from 0.1 to 2% of potassium expressed as potassium oxide,
   from 0 to 2% of boron expressed as boron oxide
   from 0 to 4% of phosphorus expressed as phosphoric anhydride
   from 0 to 3% of zinc, manganese, titanium or mixture thereof, expressed as oxides of these elements
   from 0 to 1% of fluoride, chloride, or mixture thereof, expressed as calcium fluoride and calcium chloride.

The mineralogical phases of the BCSAF clinker of the composition according to the invention may preferably comprise, in % expressed by mass relative to the total mass of BCSAF clinker in the composition, the following secondary elements:
from 0.2 to 1.5% of sodium expressed as sodium oxide,
from 0.2 to 1.5% of potassium expressed as potassium oxide,
from 0.2 to 2% of boron expressed as boron oxide,
from 0 to 1% of fluoride plus chloride, or mixture thereof, expressed as calcium fluoride and calcium chloride.

Preferably, the mineralogical phases of the BCSAF clinker of the composition according to the invention may comprise, in % expressed by mass relative to the total mass of BCSAF clinker in the composition, the following secondary elements:
from 0.2 to 2% of boron expressed as boron oxide;
from 0.1 to 2% of potassium expressed as potassium oxide.

According to another preferred embodiment, the mineralogical phases of the BCSAF clinker of the composition according to the invention may comprise, in % expressed by mass relative to the total mass of BCSAF clinker in the composition, the following secondary elements:
from 0.2 to 2% of boron expressed as boron oxide;
from 0.1 to 2% of sodium expressed as sodium oxide.

According to another preferred embodiment, the mineralogical phases of the BCSAF clinker of the composition according to the invention may comprise, in % expressed by mass relative to the total mass of BCSAF clinker in the composition, the following secondary element:
from 0.2 to 2% of boron expressed as boron oxide.

According to another preferred embodiment, the mineralogical phases of the BCSAF clinker of the composition according to the invention may comprise, in % expressed by mass relative to the total mass of BCSAF clinker in the composition, the following secondary elements:
from 0.2 to 2% of potassium expressed as potassium oxide;
from 0.5 to 4% of phosphorus expressed as phosphorus oxide ($P_2O_5$).

According to another preferred embodiment, the mineralogical phases of the BCSAF clinker of the composition according to the invention may comprise, in % expressed by mass relative to the total mass of BCSAF clinker in the composition, the following secondary elements:
from 0.2 to 2% of potassium expressed as potassium oxide;
from 0.5 to 4% of phosphorus expressed as phosphorus oxide ($P_2O_5$);
less than 0.1% of boron expressed as boron oxide.

A suitable source of boron according to the invention is for example borax, boric acid, or all other compounds containing boron; the source of boron may come from quarries or be the result of an industrial process.

According to a variant of the invention, the BCSAF clinker does not comprise borax, or boron or compounds comprising boron.

Preferably, the composition according to the invention comprises sodium and potassium as secondary elements.

Preferably, the BCSAF clinker of the composition according to the invention does not comprise a mineralogical phase $C_3S$.

Another aspect of the invention is to provide a process for production of a composition according to the invention comprising a step of putting in contact at least one polycarboxylic acid or salts thereof with the BCSAF clinker. This process for production of a composition according to the invention may optionally comprise a step of grinding and/or homogenisation.

The Belite-Calcium-Sulphoaluminate-Ferrite clinker (BCSAF clinker) of the composition according to the invention may be obtained according to the process described in patent application WO 2006/018569 or the BCSAF clinker may be the same as the one described in patent application WO 2006/018569.

The BCSAF clinker of the composition according to the invention may be made according to other processes and in particular in the following manner:

a) preparing a raw meal comprising a raw material or a mix of raw materials, able, by clinkerisation, to provide the phases in the required proportions:
   $C_2A_XF_{(1-X)}$, wherein X is from 0.2 to 0.8,
   $C_4A_3\bar{S}$, and
   $C_2S$;

b) adding and mixing into the raw mix obtained in step a) at least one additive supplying a secondary element selected from magnesium, sodium, potassium, boron, phosphorus, zinc, manganese, titanium, fluorine, chlorine, or mixtures thereof, in a quantity calculated so that, after clinkerisation, the corresponding quantity of secondary elements, expressed as indicated above, is less than or equal to 20% by weight relative to the total weight of the clinker; and c) calcining the mix obtained in step b) at a temperature of 1150° C. to 1400° C., preferably from 1200° C. to 1325° C., for at least 15 minutes in an atmosphere which is sufficiently oxidising to avoid the calcium sulphate from being reduced to sulphur dioxide.

Preferably suitable raw materials to carry out step a) are:
   a source of silica, for example a sand, a clay, a marl, fly ash, coal combustion ash, a pozzolan, silica fume; the source of silica may come from quarries or be the result of an industrial process;
   a source of calcium for example limestone, marl, fly ash, coal combustion ash, slags, pozzolans, municipal waste incineration ash; the source of calcium may come from quarries or be the result of an industrial process;
   a source of alumina for example a clay, a marl, fly ash, coal combustion ash, a pozzolan, bauxite, alumina red mud, in particular an alumina mud coming from industrial waste during the extraction of alumina, laterites, anorthosites, albites, feldspars; the source of alumina may come from quarries or be the result of an industrial process;
   a source of iron for example iron oxide, laterites, steel industry slag, iron ore; the source of iron may come from quarries or be the result of an industrial process;
   a source of calcium sulphate for example gypsum, calcium sulphate hemihydrate (α or β), or anhydrous calcium sulphate; the suitable sources of calcium sulphate according to the invention may come from quarries or be the result of an industrial process.

The preparation of the raw meal in step a) may be carried out by mixing the raw materials. The raw materials may be mixed in step a) by putting in contact, optionally comprising a step of grinding and/or homogenisation. Preferably, the raw materials of step a) are optionally dried before step a) or optionally calcined before step a).

The raw materials may be added in sequences, either in the main input of the kiln, and/or in other inputs of the kiln.

Furthermore, the combustion residue may also be integrated in the kiln.

The suitable raw materials to carry out step b) are:
a source of boron for example borax, boric acid, colemanite or all other compounds containing boron; the source of boron may come from quarries or be the result of an industrial process;
a source of magnesium for example a magnesium salt;
a source of sodium for example a sodium salt;
a source of potassium for example a potassium salt;
a source of phosphorus for example a phosphorus salt;
a source of zinc for example a zinc oxide;
a source of manganese for example a manganese oxide;
a source of titanium for example a titanium oxide;
a source of fluorine for example fluorine salts;
a source of chlorine for example chlorine salts;
or mixtures thereof.

The suitable raw materials to carry out step b) are either in the form of powder, or semi-liquid, or liquid or solid.

Step c) is a calcining step, which means according to the invention a burning step. The term <<calcination>> is to be understood according to the invention as the reaction between the chemical elements of step b) which leads to the formation of the mineralogical phases of the BCSAF clinker. This step may be carried out in a conventional cement plant kiln (for example a rotary kiln) or in another type of kiln (for example a continuous kiln).

Preferably, the calcination takes place for a minimum of 20 minutes, more preferably for a minimum of 30 minutes, most preferably for a minimum of 45 minutes.

The term <<sufficiently oxidising atmosphere>> is to be understood as, for example, the atmosphere, but other sufficiently oxidising atmospheres may be suitable.

The invention also relates to a cement comprising at least
from 30 to 99.9% of a composition according to the invention; and
from 0.1 to 40% of calcium sulphate, % by mass relative to the total mass of cement;
from 0.1 to 70% of mineral additions, % by mass relative to the total mass of cement.

Preferably, the cement according to the invention comprises 0.1 to 40%, more preferably 0.1 to 20%, most preferably 0.1 to 10% of calcium sulphate, % by mass relative to the total mass of cement.

The suitable calcium sulphate according to the invention is preferably natural or synthetic gypsum, calcium sulphate hemihydrate (α or β), or anhydrous calcium sulphate. The suitable calcium sulphates according to the invention may come from quarries or be the result of an industrial process.

Preferably the cement according to the invention comprises 0.1 to 70% of mineral additions, more preferably from 0.1 to 50% of mineral additions, most preferably from 0.1 to 30% of mineral additions, % by mass relative to the total mass of cement.

According to a preferred embodiment, the cement according to the invention comprises at least mineral additions selected from slags (as defined in the <<Cement>> NF EN 197-1 Standard, paragraph 5.2.2), steel industry slags, pozzolanic materials (as defined in the <<Cement>> NF EN 197-1 Standard, paragraph 5.2.3), fly ash (as defined in the <<Cement>> NF EN 197-1 Standard, paragraph 5.2.4), or limestones (as defined in the <<Cement>> NF EN 197-1 Standard, paragraph 5.2.6), or mixtures thereof.

According to a variant of the invention, the preferred mineral additions are limestones.

The addition of mineral additions may be carried out by homogenisation or by co-grinding.

According to a variant, the cement according to the invention may comprise at least a Portland clinker or a Portland cement of the type CEM I, CEM II, CEM III, CEM IV or CEM V.

According to a variant, the cement according to the invention may comprise setting retarders or setting accelerators.

According to a variant of the invention, the cement according to the invention may be obtained by co-grinding of the composition according to the invention with the adequate amount of gypsum or other forms of calcium sulphate, determined by tests or calculations and optionally with the adequate amount of mineral additions, in particular limestone.

The invention also relates to a concrete or a mortar object comprising at least a BCSAF cement and at least one polycarboxylic acid or salts thereof, the said polycarboxylic acid comprising 2 to 4 carboxyl groups per molecule. This concrete according to a variant of the invention may be obtained by putting in contact the BCSAF cement with aggregates, water and optionally additives and/or mineral additions, the water being able to contain the carboxylic acid or salts thereof. According to this concrete, the carboxylic acid is present in the mixing water or may be present with the aggregates or may be present with the mineral additions, in particular with the limestone.

The invention also relates to a concrete or a mortar comprising at least a cement according to the invention. According to this concrete, the polycarboxylic acid is present with the cement according to the invention.

The invention also relates to the use of at least one polycarboxylic acid or salts thereof to increase the mechanical strength of BCSAF cements after setting, the said polycarboxylic acid comprising 2 to 4 carboxyl groups per molecule.

The polycarboxylic acid or salts thereof, used according to the invention may be put in contact directly with the mixing water, with the aggregates or the mineral additions or the cement.

According to a variant of the use according to the invention, the said acid is present in the mixing water of the BCSAF cement.

According to a variant of the use according to the invention, the said acid is present with the aggregates or the sands.

The invention also relates to a process for preparation of a concrete or of a mortar according to the invention comprising a step of mixing a cement according to the invention with aggregates, water and optionally additives.

The invention also relates to a process for preparation of a concrete or of a mortar comprising a step of mixing a BCSAF cement with aggregates, water, at least one polycarboxylic acid or salts thereof and optionally additives and/or mineral additions, the said polycarboxylic acid comprising 2 to 4 carboxyl groups per molecule.

The invention also relates to elements for the construction field made using the concrete or the mortar according to the invention or the cement according to the invention.

The following examples illustrate the invention without restricting its scope.

EXAMPLES

Materials

The BCSAF clinker was obtained from limestone, kaolinite clay, calcium sulphate, iron oxide, the chemical compositions of which are given in Table I herein below and expressed in % by mass relative to the total mass:

TABLE I

| Composition by (%) | Limestone | Kaolinite clay | Bauxite | Anhydrite (anhydrous calcium sulphate) | Iron oxide |
|---|---|---|---|---|---|
| Tot. SiO2 | 0.12 | 47.76 | 6.88 | 0.36 | 1.89 |
| Al2O3 | 0.14 | 35.36 | 85.11 | 0.18 | 0.00 |
| Fe2O3 | 0.09 | 1.34 | 1.85 | 0.12 | 95.30 |
| CaO | 55.34 | 0.73 | 0.46 | 40.80 | 0.00 |
| MgO | 0.19 | 0.27 | 0.18 | 0.00 | 0.03 |
| SO3 | 0.03 | 0.05 | 0.00 | 56.84 | 0.00 |
| Loss on ignition | 44.06 | 12.04 | 0.46 | 1.70 | 2.00 |
| P2O5 | 0.00 | 0.00 | 0.01 | 0.00 | 0.06 |
| TiO2 | 0.00 | 0.05 | 4.13 | 0.00 | 0.05 |
| Mn2O3 | 0.00 | 0.00 | 0.00 | 0.00 | 0.67 |
| Tot. K2O | 0.02 | 2.21 | 0.79 | 0.00 | 0.00 |
| Tot. Na2O | 0.01 | 0.19 | 0.13 | 0.00 | 0.00 |

Production of a BCSAF Clinker:

Preparation of the raw materials: The raw materials were individually ground beforehand in order to verify the following characteristics:

0% reject at 200 µm

10% maximum reject at 100 µm.

Weighing, mixing and homogenisation of the raw materials: Preparation of the raw meal according to step a) of the process according to the invention. The weighing was carried out according to the proportions defined herein below in Table II and expressed in % by mass relative to the total mass of the raw meal:

TABLE II

| % | Limestone | Kaolinite clay | Bauxite | Anhydrite | Iron oxide |
|---|---|---|---|---|---|
| BCSAF raw meal | 61.36 | 24.80 | 3.35 | 5.47 | 5.02 |

The mixing of these constituents was carried out after weighing the different products according to the following sequence:

rough manual mixing by shaking the plastic bag containing all the constituents;

passage in a jar mill for 4 hours with a mix: 2 Kg of material+2 Kg of demineralised water;

drying in a drying oven for one night at 110° C.;

introduction of 26.59 g of Borax for 1000 g of raw meal obtained in step a) and homogenisation by passage in a mixer of the Eirich type for 3 minutes.

Granulation: After obtaining the raw meal conforming with step a) of the process according to the invention, the raw meal was submitted to a granulation operation in order to obtain sizes of granules of approximately 1 cm in diameter.

Burning: Detail of the procedure followed for the burning of BCSAF clinkers:

4 crucibles filled with 1 kg of the raw meal conforming with step a) of the process according to the invention;

introduction of the 4 full crucibles (i.e. approximately 4×250 g of raw meal) in the oven without a cover;

rise in temperature according to a temperature ramp n° 1: 1000° C./h up to 975° C.

plateau at 975° C. for 1 hour;

covers put on the crucibles;

temperature ramp N° 2: 300° C./h up to 1350° plateau at 1350° C. for 30 minutes, then the crucibles were emptied and quenched in steel tanks.

A BCSAF clinker was obtained for which the Blaine Specific Surface was 4000 cm²/g.

Production of a Cement According to the Invention:

The proportions defined herein below in Table III and IV give the proportions of the constituents of the cement made according to the invention.

The calcium sulphate is a ground anhydrous calcium sulphate (AH) from the Le Pin plant (France) with a particle size distribution less than or equal to 100 µm. The percentage of calcium sulphate, is given by mass relative to the total mass of the BCSAF clinker.

TABLE III

| | Calcium sulphate | Limestone filler | Additive |
|---|---|---|---|
| Control 1 | 3.5% AH from le Pin | 0% | 0% |
| Cement 1 | 3.5% AH from le Pin | 0% | 0.3% succinic acid/cement |
| Cement 2 | 3.5% AH from le Pin | 0% | 0.3% ascorbic acid/cement |
| Cement 3 | 3.5% AH from le Pin | 0% | 0.3% oxalic acid/cement |
| Cement 4 | 3.5% AH from le Pin | 0% | 0.3% citric acid/cement |
| Cement 5 | 3.5% AH from le Pin | 0% | 0.3% malic acid/cement |

The percentages of the additives (acids) are expressed by mass relative to the total mass of cement.

TABLE IV

| | Calcium sulphate | Limestone filler | Additive N°1 | Additive N°2 |
|---|---|---|---|---|
| Control 2 | 3.5% AH from le Pin | 25% substitution of the cement | 0% | 0% |
| Cement 6 | 3.5% AH from le Pin | 25% substitution of the cement | 0.225% oxalic acid | 0% |
| Cement 7 | 3.5% AH from le Pin | 25% substitution of the cement | 0.225% succinic acid | 0% |
| Cement 8 | 3.5% AH from le Pin | 25% substitution of the cement | 0.225% malic acid | 0% |
| Cement 9 | 3.5% AH from le Pin | 25% substitution of the cement | 0.225% ascorbic acid | 0% |
| Cement 10 | 3.5% AH from le Pin | 25% substitution of the cement | 0.225% citric acid | 0% |
| Cement 11 | 3.5% AH from le Pin | 25% substitution of the cement | 0.225% citric acid | 0.1% DEA |
| Cement 12 | 3.5% AH from le Pin | 25% substitution of the cement | 0.225% citric acid | 0.1% MDEA |

The percentage of limestone filler, is expressed by mass relative to the total mass of BCSAF cement + limestone filler. The percentages of additives (acids and alkanolamines) are expressed by mass relative to the total mass of the Cement.

Production of a Mortar According to the Invention:

The mortar was made according to the EN 196-1 Standard.

Quantities of materials used to make a mortar:

450 g cement as detailed above 1350 g standardized sand 225 g water

For the preparation of the binder, all the materials were mixed using a Turbula mixer for 30 minutes; the mixing procedure respected the EN196-1 Standard.

The mortar was then poured into steel moulds, then these moulds were placed in a cabinet at controlled hygrometry (>97%). After one day of hydration of the mortar, the prisms of mortar were demoulded and immersed in water at 20° C. until the breaking date.

The compressive mechanical strengths measured at 28 days according to the EN 196-1 Standard are given in Tables V and VI herein below. For each mortar, a control mortar not comprising polycarboxylic acid was made.

TABLE V

| | Compressive strength at 28 days |
|---|---|
| Control 1 | 50 MPa |
| Cement 1 | 56.8 MPa |
| Cement 2 | 59.3 MPa |
| Cement 3 | 59.9 MPa |
| Cement 4 | 62.3 MPa |
| Cement 5 | 63.5 MPa |

TABLE VI

| | Compressive strength at 28 days |
|---|---|
| Control 2 | 21 MPa |
| Cement 6 | 23.7 MPa |
| Cement 7 | 26.1 MPa |
| Cement 8 | 28.6 MPa |
| Cement 9 | 28.8 MPa |
| Cement 10 | 35.7 MPa |
| Cement 11 | 43.2 MPa |
| Cement 12 | 44.7 MPa |

The invention claimed is:

1. A composition comprising, in % expressed by mass relative to the total mass of the composition,
   from 0.01 to 3% of polycarboxylic acid or a salt thereof, said polycarboxylic acid comprising 2 to 4 carboxyl groups per molecule; and
   from 97 to 99.99% of a Belite-Calcium-Sulphoaluminate-Ferrite clinker (BCSAF clinker) comprising, in % expressed by mass relative to the total mass of BCSAF clinker
      from 5 to 30%, of a calcium aluminoferrite phase of a composition corresponding to the general formula $C_2A_xF_{(1-x)}$, wherein X is from 0.2 to 0.8, wherein C corresponds to CaO, A corresponds to $Al_2O_3$ and F corresponds to $Fe_2O_3$;
      from 10 to 35%, of a calcium sulfoaluminate phase corresponding to the general formula $C_4A_3\$$, wherein $ corresponds to $SO_3$;
      from 40 to 75% of belite phase corresponding to the general formula $C_2S$, wherein S corresponds to $SiO_2$;
      from 0.01 to 10% of one or more minor phases selected from calcium sulphates, alkali sulphates, perovskite, gehlenite, free lime and periclase, and/or a vitreous phase,
   and for which the total of the percentages of said phases is greater than or equal to 97%.

2. The composition according to claim 1, comprising a polycarboxylic acid or a salt thereof selected from citric acid, malonic acid, malic acid, glutaric acid, adipic acid, oxalic acid, maleic acid, tartaric acid, succinic acid, ascorbic acid, glutamic acid or mixtures thereof.

3. The composition according to claim 2, comprising a citric acid or a salt thereof.

4. The composition according to claim 1, further comprising an alkanolamine.

5. The composition according to claim 1, wherein the Belite-Calcium-Sulphoaluminate-Ferrite clinker (BCSAF clinker) does not comprise a mineralogical phase $C_3S$.

6. The composition according to claim 1, comprising from 0.03 to 1% of polycarboxylic acid, % by mass relative to the total mass of composition.

7. The composition according to claim 6, comprising from 0.1 to 0.5% of polycarboxylic acid, % by mass relative to the total mass of composition.

8. A cement comprising:
   from 30 to 99.9% of a composition according to claim 1;
   from 0.1 to 40% of calcium sulphate, % by mass relative to the total mass of cement; and
   from 0.1 to 70% of mineral additions, % by mass relative to the total mass of cement.

9. The cement according to claim 8, wherein the mineral additions are selected from slags as defined in the <<Cement>> NF EN 197-1 Standard, paragraph 5.2.2, steel industry slags, pozzolanic materials as defined in the <<Cement>> NF EN 197-1 Standard, paragraph 5.2.3, fly ash as defined in the <<Cement>> NF EN 197-1 Standard, paragraph 5.2.4, or limestones as defined in the <<Cement>> NF EN 197-1 Standard, paragraph 5.2.6, or mixtures thereof.

10. A process for preparing a concrete or a mortar, comprising mixing the cement according to claim 8 with aggregates, water, and optionally additives.

11. An element for the construction field made with the cement according to claim 8.

12. A concrete or mortar comprising a cement including a composition comprising, in % expressed by mass relative to the total mass of the composition, from 0.01 to 3% of a polycarboxylic acid or a salt thereof, said polycarboxylic acid comprising 2 to 4 carboxyl groups per molecule, and from 97 to 99.99% of a belite-calcium-sulphoaluminate-ferrite clinker comprising, in % expressed by mass relative to the total mass of belite-calcium-sulphoaluminate-ferrite clinker
   from 5 to 30%, of a calcium aluminoferrite phase of a composition corresponding to the general formula $C_2A_xF_{(1-x)}$, wherein X is from 0.2 to 0.8, wherein C corresponds to CaO, A corresponds to $Al_2O_3$ and F corresponds to $Fe_2O_3$;
   from 10 to 35%, of a calcium sulfoaluminate phase $C_4A_3\$$, wherein $ corresponds to $SO_3$;
   from 40 to 75% of belite phase $C_2S$, wherein S corresponds to $SiO_2$;
   from 0.01 to 10% of one or more minor phases selected from calcium sulphates, alkali sulphates, perovskite, gehlenite, free lime and periclase, and/or a vitreous phase,
and for which the total of the percentages of said phases is greater than or equal to 97%.

13. The concrete or mortar according to claim 12, wherein the cement comprises
   from 30 to 99.9% of said composition;
   from 0.1 to 40% of calcium sulphate, % by mass relative to the total mass of cement; and
   from 0.1 to 70% of mineral additions, % by mass relative to the total mass of cement.

14. An element for the construction field made with the concrete or the mortar according to claim 12.

15. A method comprising increasing a mechanical strength of a cement after setting, the cement including a composition comprising in % expressed by mass relative to the total mass of the composition from 97 to 99.99% of a belite-calcium-sulphoaluminate-ferrite clinker, by adding in % expressed by mass relative to the total mass of the composition from 0.01 to 3% of a polycarboxylic acid or a salt thereof to the belite-calcium-sulphoaluminate-ferrite clinker, said polycarboxylic acid comprising 2 to 4 carboxyl groups per molecule, wherein the belite-calcium-sulphoaluminate-ferrite clinker includes, in % expressed by mass relative to the total mass of belite-calcium-sulphoaluminate-ferrite clinker from 5 to 30%, of a calcium aluminoferrite phase of a composition corresponding to the general formula $C_2A_xF_{(1-x)}$, wherein X is from 0.2 to 0.8, wherein X is from 0.2 to 0.8, C corresponds to CaO, A corresponds to $Al_2O_3$ and F corresponds to $Fe_2O_3$;

from 10 to 35%, of a calcium sulfoaluminate phase $C_4A_3\$$, wherein $ corresponds to $SO_3$;

from 40 to 75% of belite phase $C_2S$, wherein S corresponds to $SiO_2$;

from 0.01 to 10% of one or more minor phases selected from calcium sulphates, alkali sulphates, perovskite, gehlenite, free lime and periclase, and/or a vitreous phase, and for which the total of the percentages of said phases is greater than or equal to 97%.

16. A concrete or mortar comprising:

a polycarboxylic acid or a salt thereof, said polycarboxylic acid comprising 2 to 4 carboxyl groups per molecule; and a cement including a source of calcium sulphate and a belite-calcium-sulphoaluminate-ferrite clinker that includes, in % expressed by mass relative to the total mass of belite-calcium-sulphoaluminate-ferrite clinker, from 5 to 30% of a calcium aluminoferrite phase of a composition corresponding to the general formula $C_2A_xF_{(1-x)}$, wherein X is from 0.2 to 0.8, C corresponds to CaO, A corresponds to $Al_2O_3$ and F corresponds to $Fe_2O_3$;

from 10 to 35% of a calcium sulfoaluminate phase $C_4A_3\$$, wherein $ corresponds to $SO_3$;

from 40 to 75% of belite phase $C_2S$, wherein S corresponds to $SiO_2$;

from 0.01 to 10% of one or more minor phases selected from calcium sulphates, alkali sulphates, perovskite, gehlenite, free lime and periclase, and/or a vitreous phase, wherein the total of the percentages of said phases is greater than or equal to 97%.

17. A method for preparing a concrete or mortar according to claim 16, comprising mixing the polycarboxylic acid or a salt thereof, the cement, water, aggregates and optionally additives.

18. The method according to claim 17, wherein said acid is present in the mixing water of the cement.

19. The concrete or mortar according to claim 16, wherein the polycarboxylic acid or a salt thereof is in an amount from about 0.003% to 3% by mass relative to the total mass of the cement.

* * * * *